US008218856B2

(12) United States Patent
Kondo et al.

(10) Patent No.: US 8,218,856 B2
(45) Date of Patent: Jul. 10, 2012

(54) INFORMATION PRESENTATION SYSTEM, INFORMATION PRESENTATION APPARATUS, INFORMATION PRESENTATION METHOD, PROGRAM, AND RECORDING MEDIUM ON WHICH SUCH PROGRAM IS RECORDED

(75) Inventors: Tetsujiro Kondo, Tokyo (JP); Yoshinori Watanabe, Kanagawa (JP); Kazutaka Uchida, Tokyo (JP); Naohide Yamada, Tokyo (JP); Ryotaku Hayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 1008 days.

(21) Appl. No.: 12/186,789

(22) Filed: Aug. 6, 2008

(65) Prior Publication Data

US 2009/0060320 A1 Mar. 5, 2009

(30) Foreign Application Priority Data

Aug. 30, 2007 (JP) ................................. 2007-224732

(51) Int. Cl.
*G09G 5/00* (2006.01)
*G06K 9/00* (2006.01)

(52) U.S. Cl. ......................................... 382/154; 345/1.1

(58) Field of Classification Search ................... 382/154, 382/254, 274; 345/1.1, 2.1–2.2
See application file for complete search history.

(56) References Cited

U.S. PATENT DOCUMENTS

| 7,027,083 | B2* | 4/2006 | Kanade et al. | 348/159 |
|---|---|---|---|---|
| 7,102,666 | B2* | 9/2006 | Kanade et al. | 348/159 |
| 7,636,452 | B2* | 12/2009 | Kamon | 382/103 |
| 2002/0030741 | A1* | 3/2002 | Broemmelsiek | 348/169 |
| 2002/0063711 | A1* | 5/2002 | Park et al. | 345/428 |
| 2003/0122667 | A1* | 7/2003 | Flynn | 340/540 |
| 2003/0142209 | A1* | 7/2003 | Yamazaki et al. | 348/143 |
| 2003/0151562 | A1* | 8/2003 | Kulas | 345/1.1 |
| 2004/0125044 | A1* | 7/2004 | Suzuki | 345/1.1 |
| 2005/0012817 | A1* | 1/2005 | Hampapur et al. | 348/143 |

FOREIGN PATENT DOCUMENTS

JP 2006-294032 10/2006

* cited by examiner

*Primary Examiner* — Andrae S Allison
(74) *Attorney, Agent, or Firm* — Oblon, Spivak, McClelland, Maier & Neustadt, L.L.P.

(57) ABSTRACT

Disclosed is an information presentation system that includes a plurality of information presentation apparatuses movable and displaying images of a plurality of objects, and a control apparatus outputting control signals for controlling the information presentation apparatuses. Each information presentation apparatus includes a display unit, a moving unit, a driving unit, a position sensor, a first communication unit, and a control unit. The control apparatus includes an object position information obtaining unit, a second communication unit, and a control unit. The control unit of the information presentation apparatus control to display an image of the object, for which position information has been obtained by the object position information obtaining unit of the control apparatus, on the display unit and control to drive the driving unit based on the control signal received by the first communication unit.

8 Claims, 11 Drawing Sheets

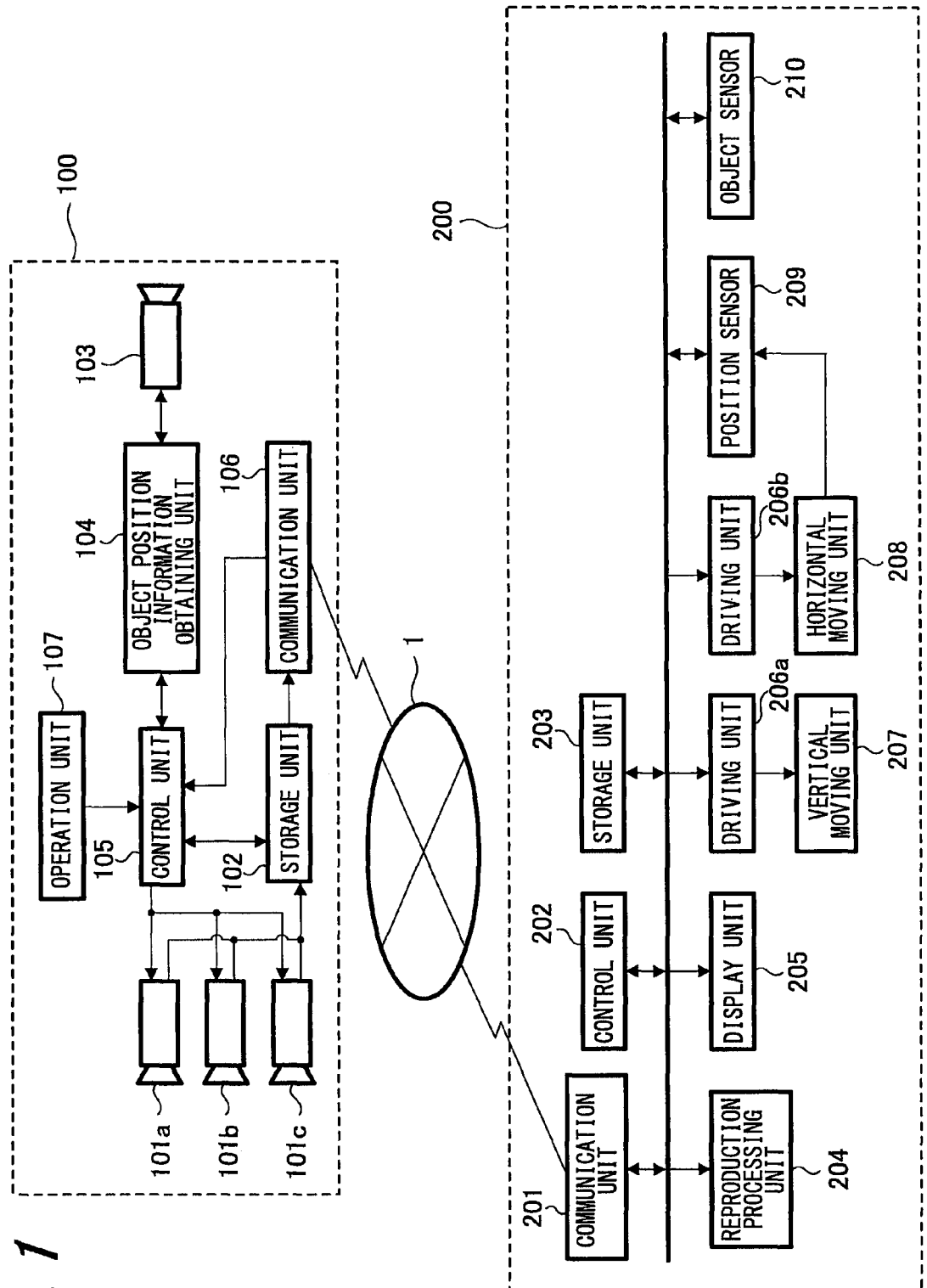

FIG. 2A
FIG. 2B
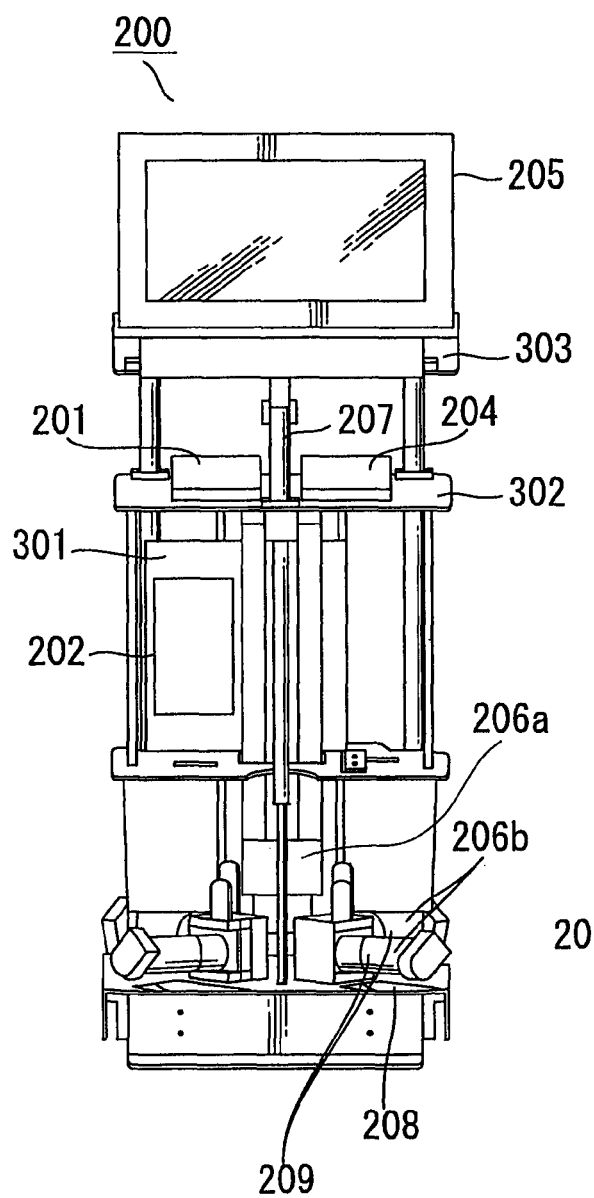
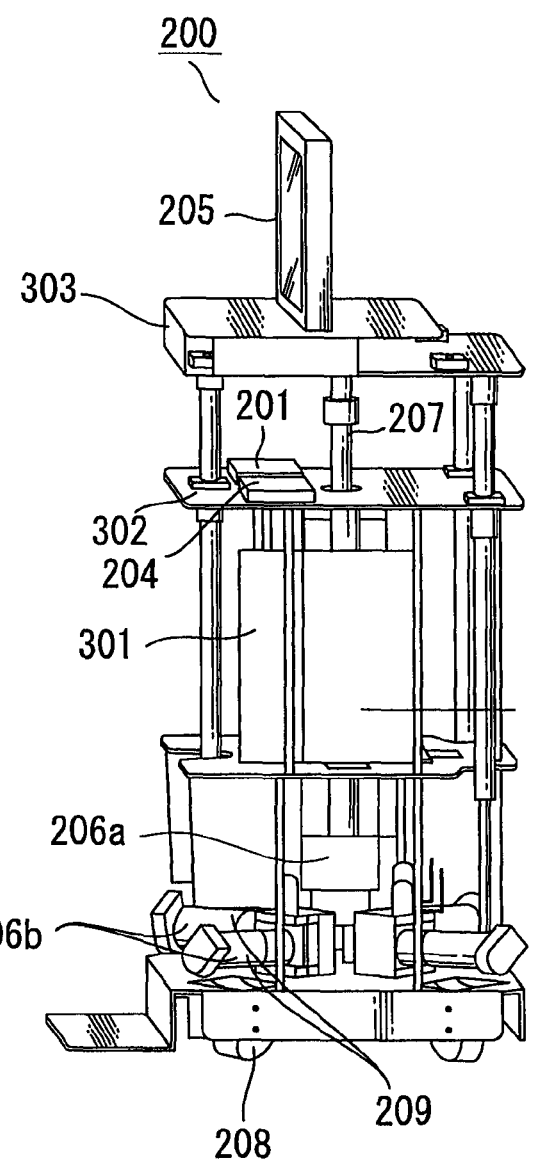

FIG. 5

| \multicolumn{5}{l}{A: Contents_name A} |
|---|---|---|---|---|

Tb1

| A: Contents_name A |||||
|---|---|---|---|---|
| B: Contents_name B |||||
| C: Contents_name C |||||
| time | name | X | Y | Z |
| 0.0 | A | −100.0 | 60.0 | 20.0 |
| 0.0 | B | −30.0 | −80.0 | 60.0 |
| 0.0 | C | 100.0 | 10.0 | −30.0 |
| 0.1 | A | −100.0 | 60.0 | 20.0 |
| 0.1 | B | −30.0 | −80.0 | 60.0 |
| 0.1 | C | 100.0 | 10.0 | −30.0 |
| 0.2 | A | −40.0 | 60.0 | 20.0 |
| 0.2 | B | −30.0 | −80.0 | 60.0 |
| 0.2 | C | 100.0 | 10.0 | −30.0 |
| 0.3 | A | −40.0 | 60.0 | 20.0 |
| 0.3 | B | −30.0 | −80.0 | 60.0 |
| 0.3 | C | 100.0 | 10.0 | −30.0 |
| ⋮ | ⋮ | ⋮ | ⋮ | ⋮ |

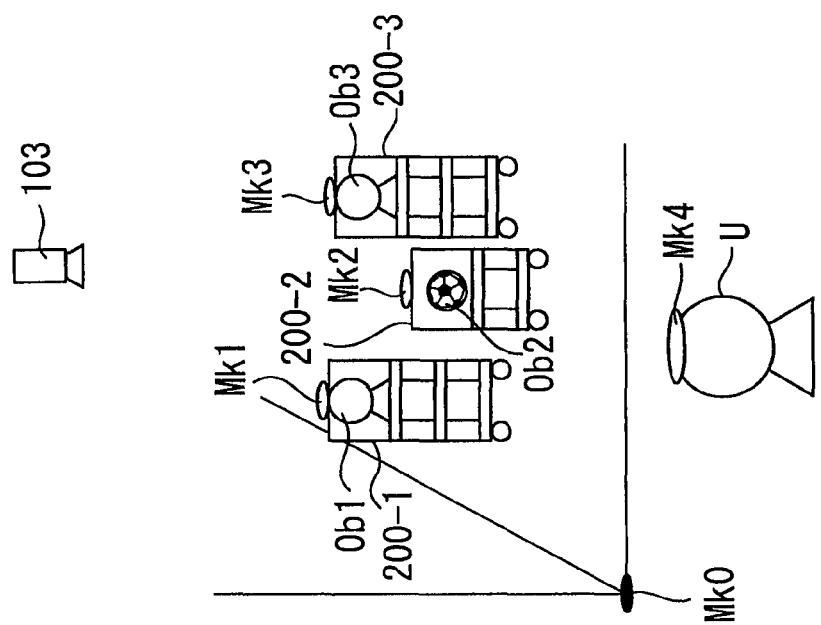
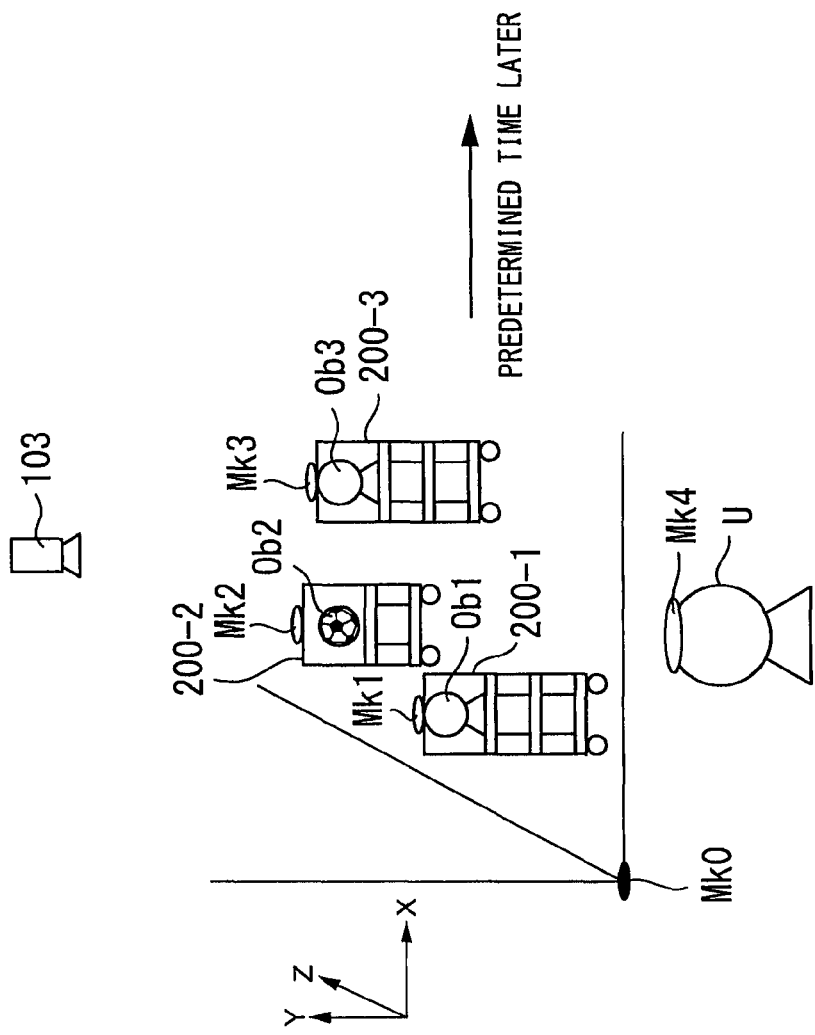

INFORMATION PRESENTATION SYSTEM, INFORMATION PRESENTATION APPARATUS, INFORMATION PRESENTATION METHOD, PROGRAM, AND RECORDING MEDIUM ON WHICH SUCH PROGRAM IS RECORDED

CROSS REFERENCES TO RELATED APPLICATIONS

The present invention contains object matter related to Japanese Patent Application JP 2007-224732 filed in the Japanese Patent Office on Aug. 30, 2007, the entire contents of which being incorporated herein by reference.

BACKGROUND OF THE INVENTION

1. Field of the Invention

The present invention relates to an information presentation system, an information presentation apparatus, an information presentation method, a program, and a recording medium on which such program is recorded that can favorably reproduce movement of objects in image contents.

2. Description of the Related Art

A variety of technologies such as high-definition television broadcasting, increased viewing angles for image display screens, and multichannel audio such as 5.1 channel surround have been proposed in recent years to provide users with more realistic images and audio.

As one example, Japanese Unexamined Patent Application Publication No. 2006-294032 discloses a technology for dividing and displaying image data, which is expressed so as to surround the user, on a plurality of display apparatuses that are physically arranged around the user.

SUMMARY OF THE INVENTION

Since it is possible to present the user with images from a variety of angles by using this technology, the user can enjoy heightened realism. However, with the technology disclosed in Japanese Unexamined Patent Application Publication No. 2006-294032 and the technologies mentioned above as the related art, since the sense of realism is produced using images and audio only, there is a certain limit on what can be achieved.

That is, in information that includes only images and audio, the positional relationships in the depth direction and the height direction between the objects that appear in the images are expressed by the sizes of the objects in the images and the volume of audio. This means that by using only the information described above, it may not be possible to realistically reproduce the sense of perspective between objects, the distances between such objects, and the like.

Embodiments of the present invention intend to reproduce the positional relationships between objects in images with heightened realism.

An information presentation apparatus according to an embodiment of the present invention is movable and displays images of a plurality of objects, where the number of information presentation apparatuses corresponds to the number of objects and each information presentation apparatus includes a display unit that displays images of the objects, a moving unit capable of moving in a horizontal direction and a vertical direction, and a driving unit that drives the moving unit. Each information presentation apparatus also includes a position sensor that obtains position information for the information presentation apparatus, an object position information obtaining unit that obtains a position in a three-dimensional space of an object, and a control unit that calculates a movement target position based on the position of the object obtained by the object position information obtaining unit and outputs a control signal to the driving unit to move the information presentation apparatus. The control unit also control to display an image of the object, for which position information has been obtained by the object position information obtaining unit, on the display unit.

In this manner, it is possible for the movable information presentation apparatus to move in the horizontal and vertical directions based on the position in a three-dimensional space of objects in an image.

According to an embodiment of the present invention, it is possible for a movable information presentation apparatus to move in the horizontal and vertical directions based on the position in a three-dimensional space of an object in an image. The positional relationships between objects in images can therefore be reproduced to the user with heightened realism.

BRIEF DESCRIPTION OF THE DRAWINGS

FIG. 1 is a block diagram showing an example configuration of an information presentation system according to an embodiment of the present invention;

FIGS. 2A and 2B are views showing an example configuration of an information presentation apparatus according to an embodiment of the present invention, where FIG. 2A is a front view and FIG. 2B is a side view;

FIG. 5 is a diagram useful in explaining one example of a correspondence table for object position information and contents according to an embodiment of the present invention;

FIGS. 8A and 8B are schematic diagrams showing an example where images are viewed at a third party viewpoint according to an embodiment of the present invention;

FIGS. 11A to 11C respectively illustrates cases (1) where time code in content is designated, (2) where information presentation apparatus to move is designated, and (3) where movement target position is designated.

DESCRIPTION OF THE PREFERRED EMBODIMENTS

Figure 3:
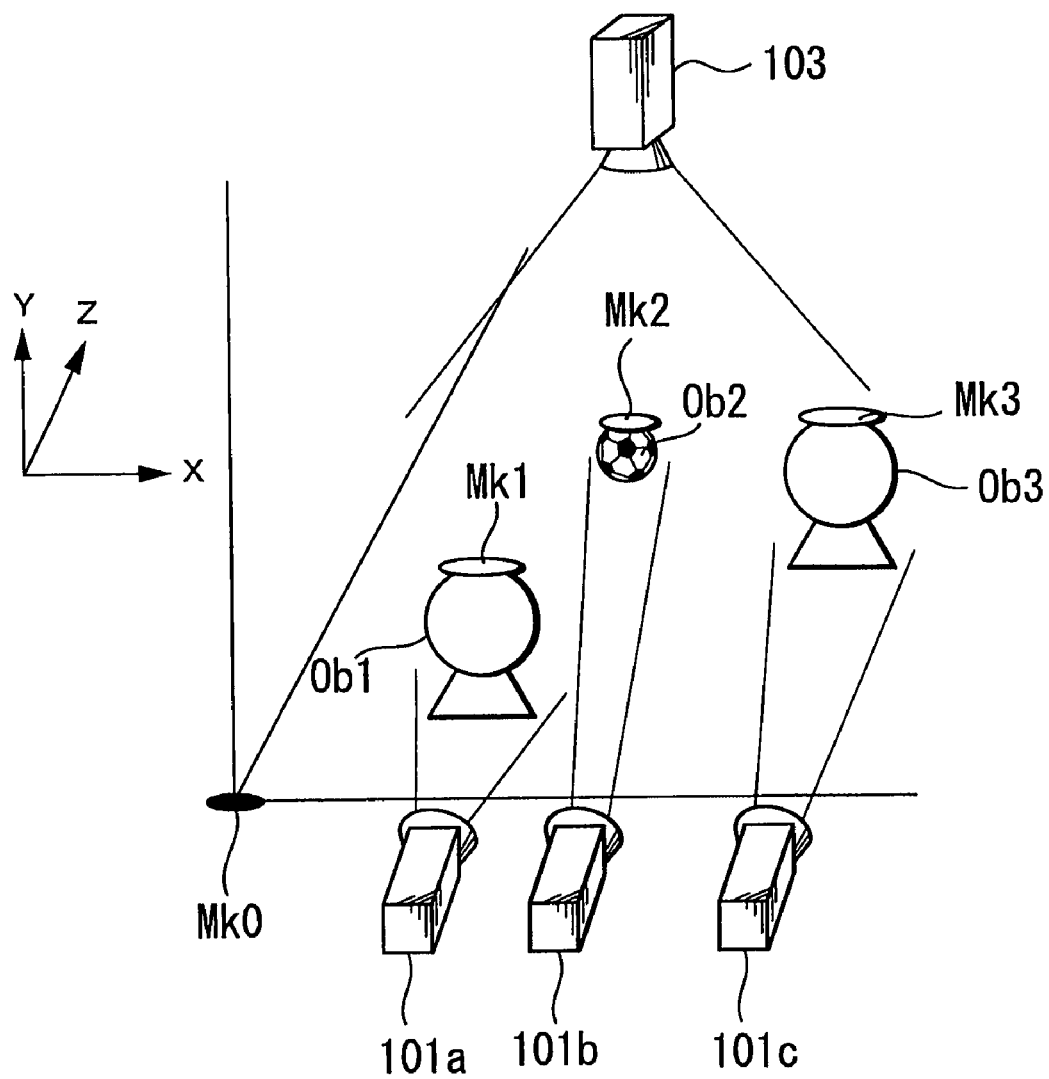
FIG. 3 is a diagram showing an example of the processing when generating image contents according to an embodiment of the present invention.

Preferred embodiments of the present invention will now be described with reference to the attached drawings. In the present embodiments, image contents (hereinafter simply referred to as "contents") to be presented by information presentation apparatuses are picked up in advance using cameras, and position information of objects in a three-dimensional space is simultaneously obtained during image pickup by the cameras. Such information presentation apparatuses reproduce the image contents obtained in this manner and are controlled so as to move based on the position information of the objects obtained during image pickup.

As the method of obtaining the position information of the objects, a method that calculates the positions of objects (the objects) based on image signals obtained by an overhead view camera that carries out image pickup for an overhead view of the entire space in which the objects are present is used. Also, while the information presentation apparatuses are presenting information, position information on the information presentation apparatuses is obtained based on an image signal obtained by the overhead view camera and the actual positions of the information presentation apparatuses are adjusted based on the obtained position information. Note that a configuration is used in the present embodiment where three-dimensional positions of the objects are obtained based on an image signal obtained by an overhead view camera. However, it is also possible to use a configuration that obtains three-dimensional positions of the objects using a camera with a measurement function, or alternatively to use a configuration where a GPS (Global Positioning System) apparatus is attached to each individual object and information presentation apparatus so that the information presentation apparatuses can obtain position information for their own positions.

FIG. 1 shows one example of the internal configuration of an information presentation system according to the present embodiment. In FIG. 1, an information presentation apparatus 200 and a control apparatus 100 are connected via a wireless network 1 so as to be capable of communicating with one another. Although only one information presentation apparatus 200 is shown in FIG. 1, a plurality of such apparatuses are provided corresponding to the number of objects in reality. Since it is assumed in the present embodiment that there are three objects, the number of information presentation apparatuses 200 is three.

The configuration of the control apparatus 100 will be described first. The control apparatus 100 includes object image pickup cameras 101a, 101b, 101c, a storage unit 102, an overhead view camera 103, an object position information obtaining unit 104, a control unit 105, and a communication unit 106.

The object image pickup cameras 101a, 101b, 101c pick up images of respectively different objects and output the image signals obtained by image pickup to the storage unit 102. The storage unit 102 includes a DVD (Digital Versatile Disc) drive, a HDD (hard disk drive) or the like, stores the image signals obtained by the object image pickup cameras 101a to 101c, and also stores position information of the object or the information presentation apparatus 200 obtained by the object position information obtaining unit 104 described later. Note that the storage unit 102 may be an external storage medium. Also, although the present embodiment is constructed so that the image signals obtained by the object image pickup cameras 101a to 101c are stored in the storage unit 102, it is also possible for the image signals to be directly transmitted via the communication unit 106, described later, to the information presentation apparatuses 200.

The overhead view camera 103 carries out image pickup from a high position looking down on the objects and outputs the obtained image signal to the object position information obtaining unit 104. Image pickup by the overhead view camera 103 is carried out not only when generating contents but also when presenting contents. In the following description, the space object to image pickup by the overhead view camera 103 during the generation of an image content is referred to as the "image pickup space" and the space object to image pickup during information presentation is referred to as the "information presentation space". The object position information obtaining unit 104 obtains the three-dimensional position information of each object in the image pickup space or the three-dimensional position information of each information presentation apparatus 200 in the information presentation space from the image signal outputted from the overhead view camera 103 and outputs the obtained position information to the control unit 105. The method of obtaining the three-dimensional positions of the objects or the information presentation apparatuses 200 is described in detail later.

The control unit 105 includes an MPU (Micro Processing Unit) for example, and controls the various components that construct the control apparatus 100. More specifically, the control unit 105 carries out processing that generates a correspondence table that associates three-dimensional position information of the objects at each point in time that has been outputted from the object position information obtaining unit 104 with the contents to be presented on each information presentation apparatus and stores the generated correspondence table in the storage unit 102. The present embodiment aims to accurately reproduce three-dimensional movement of objects in each content by moving the information presentation apparatuses 200 that display images of the objects. Accordingly, the correspondence table generated in this manner records the three-dimensional positions of the objects in the images at each point in time in the contents and simultaneously shows movement target positions of the respective information presentation apparatuses 200. The correspondence table will be described in detail later.

The control unit 105 stores the correspondence table in the storage unit 102, decides the movement target position of each information presentation apparatus 200 at each point in time from the start of information presentation, includes the decided movement target position in a control signal, and outputs the control signal to the communication unit 106. During the presentation of information, the control unit 105 generates a control signal for setting the difference between the movement target position of each information presentation apparatus 200 and the actual position of such information presentation apparatus 200 to zero, and outputs the control signal to the communication unit 106.

The communication unit 106 transmits the control signals outputted from the control unit 105 to the respective information presentation apparatuses 200, and also receives position information of the respective information presentation apparatuses 200 transmitted from such apparatuses 200 and outputs the position information to the control unit 105.

An operation unit 107 generates an instruction signal in accordance with an instruction inputted by the user and outputs the generated instruction signal to the control unit 105. In the present embodiment, there are a plurality of states in which the user can view contents, and an operation that selects one of such modes is carried out using the operation unit 107. As the states in which the user can view contents, a mode where the viewer is viewing from a predetermined position somewhat distant from the disposed positions of the plurality of information presentation apparatuses 200 (i.e., a mode where the user is viewing from a "third-party" viewpoint), and a mode where the user virtually becomes one of the objects shown in the images and the viewpoint from such position is shown on the information presentation apparatuses 200 are provided. When the mode where the user virtually becomes one of the objects being shown in the images and such viewpoint is shown on the information presentation apparatuses 200 is selected, a designation of the object whose viewpoint the user wishes to become is also received. The respective modes will be described in detail later in this specification.

In the mode where the user is viewing from a predetermined position somewhat distant from the disposed positions of the plurality of information presentation apparatuses 200 also, there are a plurality of types provided for the user's viewing state. Such types are a type where the user is viewing from a predetermined stationary position and a type where the user views images while freely moving around the information presentation space. Switching between these types is also carried out by an operation of the operation unit 107. Note that it may not be necessary to provide all of the above viewing states for the user, and the present invention may be applied to a configuration where only one mode (type) is provided.

Next, one example of the internal configuration of each information presentation apparatus 200 will be described with reference to FIG. 1. The information presentation apparatus 200 includes a communication unit 201, a control unit 202, a storage unit 203, a reproduction processing unit 204, a display unit 205, driving units 206a and 206b, a vertical moving unit 207, a horizontal moving unit 208, a position sensor 209, and an object sensor 210.

The communication unit 201 receives a control signal transmitted from the control apparatus 100 and also carries out processing that transmits position information for the present device (i.e., this information presentation apparatus 200) obtained by the position sensor 209, described later, to the control apparatus 100. The control unit 202 includes an MPU or the like and controls the various components that construct the information presentation apparatus 200. The storage unit 203 includes a DVD drive, an HDD, or the like, and stores an image content to be displayed on the display unit 205, described later, and the like. In the present embodiment, images picked up by one of the object image pickup cameras 101a to 101c of the control apparatus 100 are used as the image content. That is, an image content where position information is obtained at each point in time in the images is stored. Note that a configuration may be used where an image content obtained via the communication unit 201 is reproduced in real time, and in such case, the storage unit 203 does not need to be provided.

The reproduction processing unit 204 reads the image content stored in the storage unit 203 and processes the image content for display on the display unit 205. The display unit 205 includes an LCD (Liquid Crystal Display) and displays images outputted from the reproduction processing unit 204.

The driving unit 206a is an actuator for driving the vertical moving unit 207. The vertical moving unit 207 includes a pillar that is capable of lengthening and shortening in the vertical direction and the driving unit 206a includes a hydraulic cylinder for moving the pillar in the up-down direction. The driving unit 206b is an actuator for driving the horizontal moving unit 208. The horizontal moving unit 208 includes wheels and the driving unit 206b having motors for driving the wheels. Note that the movement in the horizontal direction may be realized using a belt conveyor or the like, and that movement in the horizontal direction and the vertical direction can be realized using an arm that supports the entire information presentation apparatus 200.

The horizontal moving unit 208 formed with wheels is connected to the position sensor 209. The position sensor 209 includes rotary encoders or the like that detect the amount of rotation of the wheels, and by detecting the amount of movement, the rotation angle, or the like of the wheels, position information for the information presentation apparatus 200 is obtained. The detailed mechanisms of the information presentation apparatus 200 will be described later. Note that as a means for obtaining the rotation angle of the information presentation apparatus 200, it is also possible to use a gyro or the like.

The object sensor 210 is a sensor that detects the positions of obstacles in the periphery of the information presentation apparatus 200 and/or the position of a user viewing the information presentation apparatus 200 and outputs the obtained position information to the control unit 202. As the object sensor 210, it is possible to use an infrared, laser, ultrasonic, temperature, or other sensor. Note that it is also possible to use a configuration where a camera is attached in place of a sensor and obstacles and users are detected by the camera.

Next, one example configuration of the information presentation apparatus 200 will be described with reference to FIGS. 2A and 2B. FIG. 2A is a front view and FIG. 2B is a side view. The wheels 208 as the horizontal moving unit are provided at the lowest part of the information presentation apparatus 200 and the motors (driving unit) 206b that drive the wheels 208 are provided above a platform to which the wheels 208 are attached. Rotary encoders (position sensors) 209 for detecting the amount of rotation of the wheels 208 are disposed at positions near where the motors 206a are disposed. Since four wheels 208 are provided in the present embodiment, four motors 206b and four rotary encoders 209 are provided corresponding to the number of the wheels 208.

The pillar (vertical moving unit) 207 that is perpendicular to the platform to which the wheels 208 are attached is provided in the center of the platform, and the hydraulic cylinder (driving unit) 206a that moves the pillar 207 in the vertical direction is disposed at a position near the pillar 207. FIGS. 2A and 2B show how a plate-like control unit mounting portion 301 for mounting the control unit 202 is perpendicularly provided at a side surface part of the hydraulic cylinder 206a and the control unit 202 is mounted on the control unit mounting portion 301.

A mounting portion 302 that is a platform for mounting the communication unit 201, the reproduction processing unit 204, and the like is provided above the control unit mounting portion 301 and a display unit mounting portion 303 that is a platform for mounting the display unit 205 is provided further above the mounting portion 302. The pillar 207 used as the vertical moving unit extends from the lower surface of the display unit mounting portion 303 to the platform that has the wheels 208 therebelow, and by causing the pillar 207 to lengthen and shorten in the vertical direction using the hydraulic cylinder 206a, the display unit mounting portion 303 on which the control unit 202 is mounted is raised and lowered in the vertical direction in accordance with such movement.

Next, an example of the processing that obtains three-dimensional position information for objects in the image pickup space simultaneously with the generation of image contents to be displayed by the information presentation apparatuses 200 will be described with reference to the schematic diagram in FIG. 3 and the flowchart in FIG. 4. FIG. 3 shows a state where a person (object) Ob1, a soccer ball Ob2, and a person Ob3 are present as the objects in the image pickup space object to image pickup by the overhead view camera 103. In the example in FIG. 3, the person Ob1 and the person Ob3 are playing soccer using the soccer ball Ob2, with such objects freely moving inside the image pickup space during a predetermined image pickup period.

Object image pickup cameras 101 are provided to pick up images of the respective objects and in the example shown in FIG. 3, an object image pickup camera 101a as a camera for image pickup of the person Ob1, an object image pickup camera 101b as a camera for image pickup of the soccer ball Ob2, and an object image pickup camera 101c as a camera for image pickup of the person Ob3 are provided. These cameras continuously pick up images of the assigned object during the image pickup period and change the camera angle in accordance with the movement of the object. Note that although an example where the setup positions of each of the object image pickup cameras 101 are fixed and only the camera angles are variable is shown in FIG. 3, it is also possible to use a configuration where the positions of the object image pickup cameras 101 move in accordance with the movement of the objects.

In the example shown in FIG. 3, image pickup of the objects is carried out by the object image pickup cameras 101a to 101c and image pickup is simultaneously carried out by the overhead view camera 103 to obtain three-dimensional positions of the objects. To obtain the three-dimensional positions of the respective objects, markers of respectively different colors, forms, sizes, etc. are attached to the respective objects and three-dimensional information of the respective objects (objects) is calculated based on the positions and sizes of the markers in the image signal obtained by the overhead view camera 103.

When carrying out this kind of processing, before image pickup of the image content is carried out, it may be necessary to define the range of the image pickup space in advance. When defining the image pickup space, markers are disposed at a position that is the origin for coordinates of the objects and/or at four corners or the like of the image pickup space and calibration is carried out using images picked up in this state. In this case, by disposing a number of markers in the vertical direction shown in FIG. 3 as z, it is possible to define positions on the z axis (height) direction of the image pickup space as well.

During the image pickup of image contents also, a marker Mk0 showing the origin is disposed at a same position as the position set as the origin when defining the space and markers are also attached to the respective objects. In the example shown in FIG. 3, marker Mk1 is attached to the person Ob1, marker Mk2 is attached to the soccer ball Ob2, and marker Mk3 is attached to the person Ob3.

Figure 4:
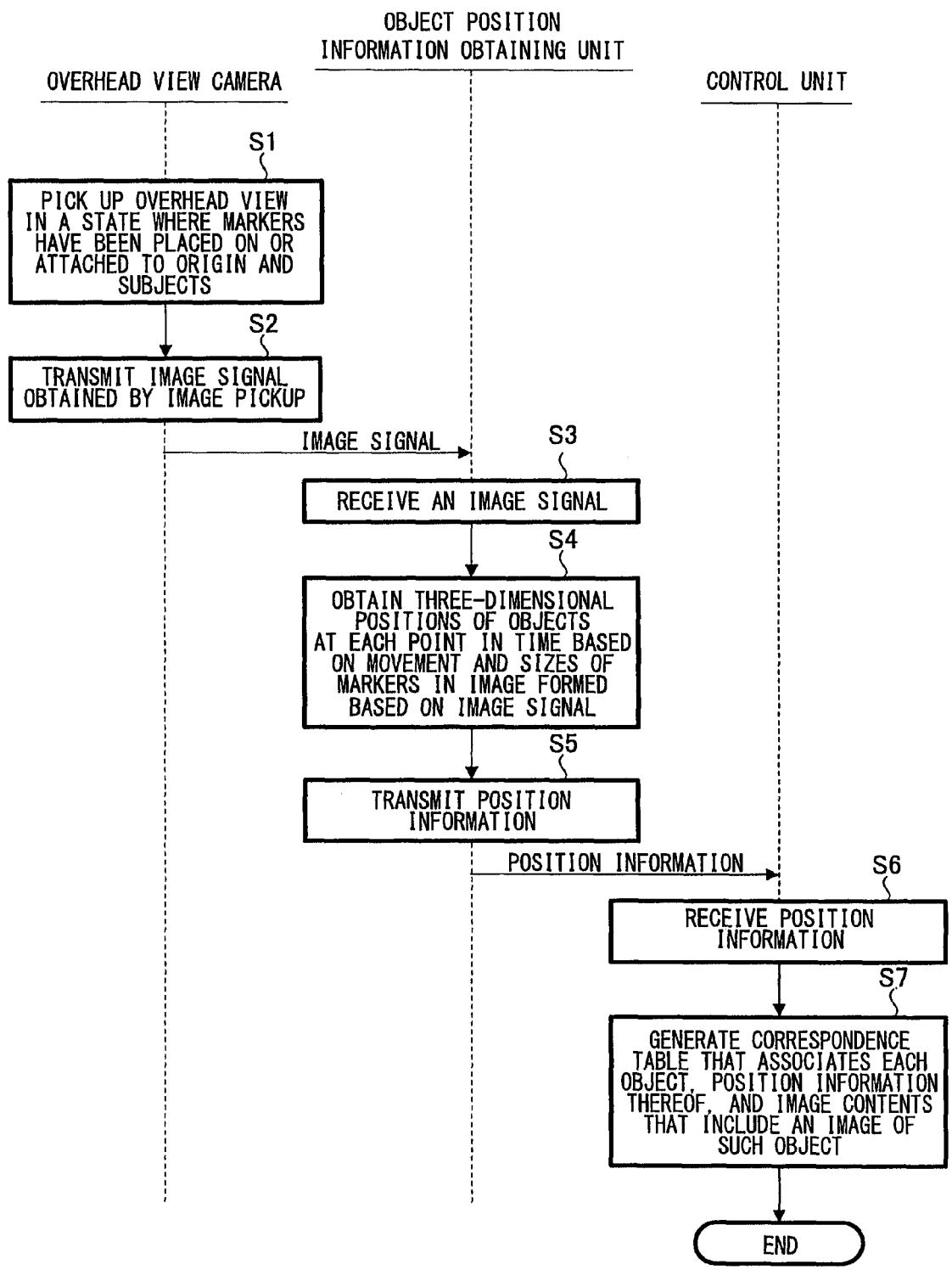
FIG. 4 is a flowchart showing an example of a position obtaining processing for objects when generating image contents according to an embodiment of the present invention.

One example of processing that obtains three-dimensional information of the respective objects from the overhead image picked up in this way is shown in FIG. 4. In FIG. 4, one example of the processing by the overhead view camera 103, the object position information obtaining unit 104, and the control unit 105 is shown.

In FIG. 4, the overhead view camera 103 first picks up an overhead view of the objects in a state where markers have been placed on or attached to the origin and the objects (step S1) and transmits an image signal obtained by picking up the overhead view to the object position information obtaining unit 104 (step S2). On receiving the image signal transmitted from the overhead view camera 103 (step S3), the object position information obtaining unit 104 obtains the positions at each point in time of the respective objects based on the movement and sizes of the respective markers in the image obtained from the image signal (step S4) and transmits the obtained position information to the control unit 105 (step S5).

On receiving the position information transmitted from the object position information obtaining unit 104 (step S6), the control unit 105 generates a correspondence table that associates each object, the position information thereof, and the image contents that include an image of such object (step S7). In step S7, a correspondence table such as that shown in FIG. 5 is generated.

The correspondence table Tb1 shown in FIG. 5 shows points in time (i.e., time codes) in the images in 0.1 second units in the leftmost column and specifies the image content provided for each object in the next column to the right. In the example in FIG. 5, there are three image contents labeled A, B, and C. As examples, image content A is images picked up for the person Ob1, image content B is images picked up for the soccer ball Ob2, and image content C is images picked up for the person Ob3 shown in FIG. 3.

In the next three columns to the right, the three-dimensional position in the image pickup space of each object picked up in the image contents A to C is shown by the three coordinates X, Y, and Z. That is, in the correspondence table Tb1 in FIG. 5, three-dimensional information for the objects is given for each point in time in the images. Here, X, Y, and Z are the distances in the X-axis direction, the Y-axis direction, and Z-axis direction from the origin (0,0,0) set in advance in the image pickup space.

For example, at the time 0.0 seconds, the coordinates of the object shown in content A are such that (X, Y, Z)=(−100.0, 60.0, 20.0), the coordinates of the object shown in content B are such that (X, Y, Z)=(−30.0, −80.0, 60.0), and the coordinates of the object shown in content C are such that (X, Y, Z)=(100.0, 10.0, −30.0). At the time 0.1 seconds, there seems no change in such coordinates, but when the time 0.2 seconds is reached, the coordinates of the object shown in content A change to (−40.0, 60.0, 20.0). That is, it can be understood that the object shown in content A at the time 0.2 seconds has moved by 60.0 in the direction of the X axis compared to the position at the time 0.0 seconds.

Note that although an example has been described where only position information expressed by the X, Y, Z coordinates is given as the information on the object in the correspondence table Tb1 shown in FIG. 5, it is also possible to record angle information for the object image pickup cameras 101a to 101c when generating the respective contents in association with the time codes.

When displaying image contents on the information presentation apparatuses 200, the control unit 105 of the control apparatus 100 sets the movement target positions of the respective information presentation apparatus 200 based on the correspondence table Tb1 generated in this way and transmits the respective movement target positions to the information presentation apparatuses 200.

Figure 6:
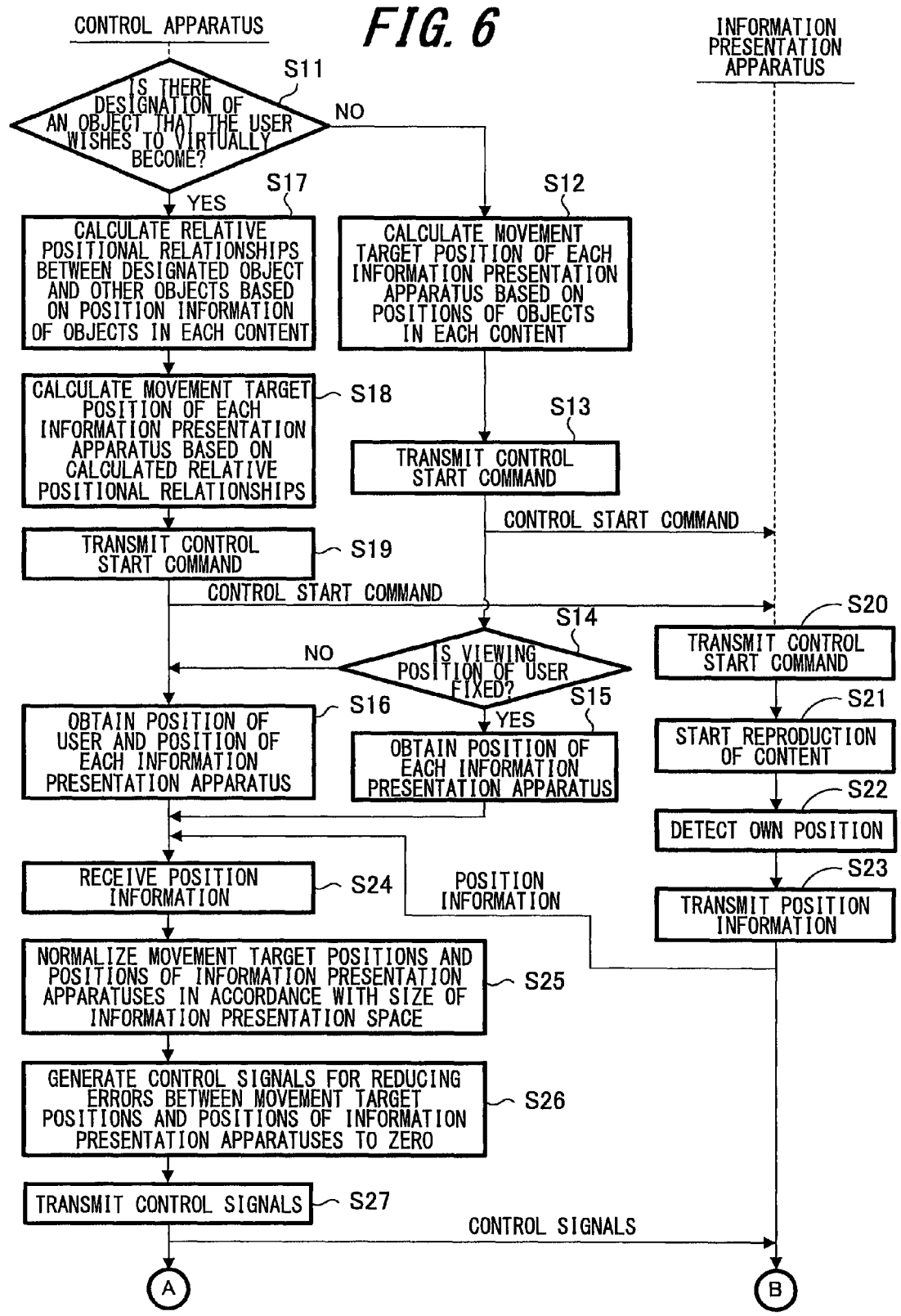
FIG. 6 is a flowchart showing an example of an information presentation processing according to an embodiment of the present invention.
Figure 7:
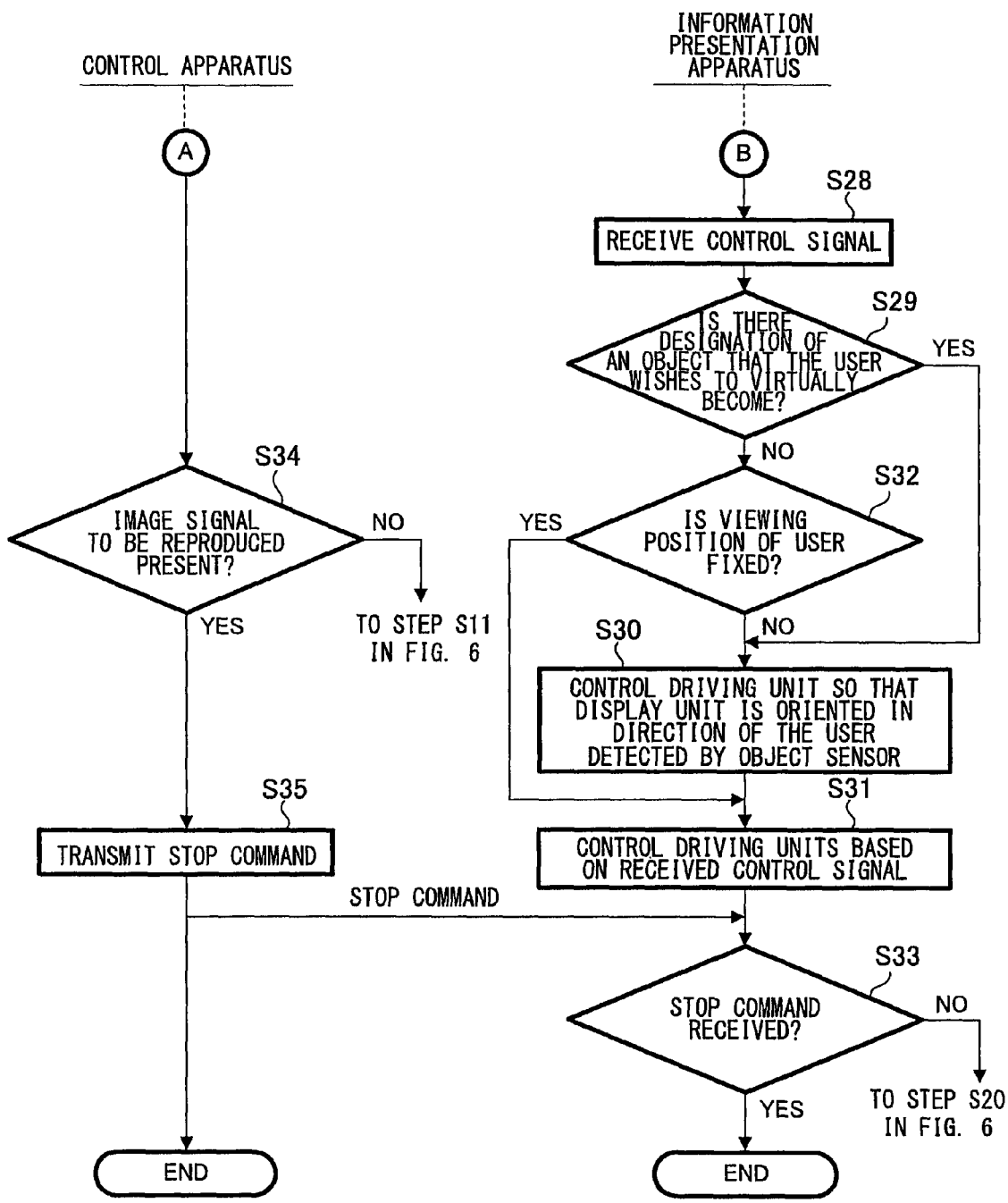
FIG. 7 is a flowchart showing an example of the information presentation processing according to an embodiment of the present invention.

Next, one example of the processing during the presentation of information by an information presentation apparatus 200 will be described with reference to the flowcharts in FIGS. 6 and 7. In FIGS. 6 and 7, the interaction between the control apparatus 100 and the information presentation apparatus 200 is shown. FIG. 6 shows the processing from transmission of control signals to the information presentation apparatuses 200 by the control apparatus 100 until the control apparatus 100 receives feedback on the position information from the respective information presentation apparatuses 200 and transmits control signals for adjusting the positions of the respective information presentation apparatuses 200.

In FIG. 6, first the control apparatus 100 judges whether the user has designated an object that the user wishes to virtually become (step S11). That is, it is determined whether a mode where the user views images by virtually becoming one out the objects shown in the images has been selected. When the object that the user wishes to virtually become has not been selected, processing that sets the movement targets of the respective information presentation apparatuses 200 based on the three-dimensional position information of the objects in each content is carried out (step S12). That is, the movement target position of each information presentation apparatus is set based on the information in the correspondence table Tb illustrated in FIG. 5. For example, for the elapsed time 0.0 seconds from the start of information presentation, the coordinates at the 0.1 second point are set as the movement target positions. After this, the set movement target positions are included in control start commands and transmitted to the information presentation apparatuses 200 (step S13).

After this, it is judged whether the viewing position of the user has been set as fixed (step S14). Since the setting of whether the viewing position of the user is fixed is made according to an input into the operation unit 107 in advance, for example, processing that checks such setting is carried out at this point. When the viewing position of the user is set as fixed, "Yes" is selected and the three-dimensional positions of the respective information presentation apparatuses 200 are obtained based on the image signal obtained by the overhead view camera 103 (step S15). When it is judged that the viewing position of the user is set as not fixed, "No" is selected, and position information of the user and position information for the respective information presentation apparatuses 200 are obtained based on an image signal obtained by the overhead view camera 103. That is, when the viewing position of the user is fixed, the obtaining of the position information of the user is not carried out, and the position information of the user is obtained only when the viewing position of the user is not fixed.

When it is judged in step S11 that an object that the user wishes to virtually become has been selected, a processing that calculates the relative positional relationships between the object designated as the object the user wishes to virtually become and the other objects is carried out based on the position information of the objects in each content (step S17). After this, the movement target position of each information presentation apparatus 200 is calculated based on the calculated relative positional relationships (step S18), and the calculated movement target position information is included in control start commands and transmitted to the information presentation apparatuses 200 (step S19). After transmission of the control start commands, based on the image signal obtained by the overhead view camera 103, the position of the user and the position information of the respective information presentation apparatus 200 are obtained (step S16).

In the processing in step S17, for the example shown in FIG. 5, when the user has selected the object obi as the object the user wishes to virtually become, the coordinates of the objects aside from the object Ob1, that is, the coordinates of the object Ob2 included in the content B and the coordinates of the object Ob3 included in the content C are converted into distances that are relative to the coordinates of the object Ob1 included in the content A, not distances from the origin. By carrying out this type of processing, the positional relationships between objects in the image pickup space can be accurately reproduced centered on the position of the user who has virtually become a specified object.

Returning to the flowchart in FIG. 6, when a control start command transmitted from the control apparatus 100 in step S13 or step S19 has been received (step S20), the information presentation apparatus 200 starts to reproduce an image content (step S21). Next, the image content is displayed on the display unit 205 (see FIG. 1). When reproduction of the content starts, position detection by the position sensor 209 (see FIG. 1) also starts (step S22) and the detected position information is transmitted to the control apparatus 100 (step S23).

In the control apparatus 100, when the position information transmitted from the information presentation apparatus 200 is received (step S24), processing is carried out to normalize the movement target position and the positions of the respective information presentation apparatuses 200 received in step S24 in accordance with the size of the information presentation space where information is being presented (step S25). Next, control signals for reducing the errors between the respective movement target positions and the positions of the information presentation apparatuses obtained from the overhead view in step S15 or step S16 to zero are generated (step S26) and the generated control signals are transmitted to the respective information presentation apparatuses 200 (step S27).

Next, the processing after the information presentation apparatus 200 receives the control signal transmitted in step S27 will be described with reference to the flowchart in FIG. 7. In FIG. 7, on receiving the control signal transmitted from the control apparatus 100 (step S28), the information presentation apparatus 200 judges whether an object that the user wishes to virtually become has been designated (step S29). When the user has selected the mode where the user views images by virtually becoming a specified object, "Yes" is selected and the processing proceeds to step S30.

In step S30, the driving unit 206b is controlled so that the display unit 205 is oriented in the direction of the user detected by the object sensor 210. After this, the driving unit 206a and the driving unit 206b are driven based on the received control signal (step S31). That is, by controlling the driving unit 206b to move to the movement target position recorded in the control signal, the horizontal moving units 208 (the wheels in the present embodiment) rotate so that the information presentation apparatus 200 moves to the movement target position. When a movement target position in the vertical direction is designated in the control signal, the driving unit 206a is controlled and the vertical moving unit 207 (a pillar in the present embodiment) lengthens and shortens based on the driving by the driving unit 206b. That is, the height of the information presentation apparatus 200 is changed.

When it is judged in step S29 that the mode where the user wishes to virtually become a specified object is not selected, it is next judged whether the viewing position of the user is fixed (step S32). When the viewing position of the user is fixed, "Yes" is selected and the processing proceeds to step S31. When it is judged that the viewing position of the user is not fixed, the processing proceeds to step S30. That is, when the viewing position of the user is fixed, the orientation of the display unit 205 is kept without adjustment at a fixed orientation (the direction of the viewing position of the user) and when the viewing position of the user is not fixed, the orientation of the display unit 205 will change in accordance with the direction of the user.

Next, it is judged whether a stop command has been transmitted from the control apparatus 100 (step S33) and when no stop command has been received, the processing returns to step S20 in FIG. 6 and continues thereafter. When a stop command transmitted from the control apparatus 100 has been received, the processing ends.

In the control apparatus 100, the processing described above continues so long as there is an image signal to be reproduced, and in step S34, it is judged whether there is still an image signal to be reproduced. When it is judged that there is an image signal to be reproduced, the processing returns to step S11 in FIG. 6 and continues thereafter. However, when it is judged that there is no image signal to be reproduced, the stop command is transmitted to the information presentation apparatus 200 (step S35). When the stop command is transmitted in step S35, since "Yes" is selected by the information presentation apparatus 200 in step S33, the processing ends.

FIGS. 8A and 8B schematically show movement of the respective information presentation apparatuses 200 for a case in which the mode where the information presentation apparatuses 200 are viewed from the third-party viewpoint has been selected. FIG. 8B shows a state where a predetermined time has elapsed from the state shown in FIG. 8A. In FIGS. 8A and 8B, the information presentation apparatus 200-1 that displays images of the person Ob1, the information presentation apparatus 200-2 that displays images of the soccer ball Ob2, and the information presentation apparatus 200-3 that displays images of the person Ob3 are disposed in the information presentation space viewed by the user U.

In the state shown in FIG. 8A, the information presentation apparatus 200-1 that displays images of the person Ob1 is positioned near the front in the Y direction and closest to the origin in the X direction. The information presentation apparatus 200-2 that displays images of the soccer ball Ob2 is positioned to the right of the information presentation apparatus 200-1 in the X direction. This information presentation apparatus 200-2 is positioned at the deepest position in the Y direction. The information presentation apparatus 200-3 that displays images of the person Ob3 is positioned to the right of the information presentation apparatus 200-2 in the X direction and slightly in front in the Y direction.

The disposed positions of the respective information presentation apparatuses 200 shown in FIG. 8A reliably reproduce the disposed positions of the objects in the image contents and correspond to the positions of the respective objects in the image pickup space shown in FIG. 3. At the stage shown in FIG. 8B where a predetermined time has elapsed from the state shown in FIG. 8A, it can be seen that the information presentation apparatuses 200-1 to 200-3 are moving. The information presentation apparatus 200-1 moves away from the user in the Y direction, the information presentation apparatus 200-2 moves to the right in the X direction and toward the user in the Y direction, and the information presentation apparatus 200-3 remains at substantially the same position as shown in FIG. 8A.

The positions shown in FIG. 8B result from the information presentation apparatuses 200-1 to 200-3 moving based on the control signals transmitted to the information presentation apparatuses 200-1 to 200-3 from the control apparatus 100 in the state shown in FIG. 8A. That is, such positions match the movement target positions given in the control signals. In this way, even while the information presentation apparatuses 200-1 to 200-3 are moving, control is carried out to eliminate the errors between the movement target positions and the actual positions of the information presentation apparatuses 200, and therefore the respective information presentation apparatuses 200 will definitely reach the movement target positions.

Although FIGS. 8A and 8B show a state where a marker Mk4 is attached to the user U also, when the viewing position of the user U is fixed, it will not be necessary to obtain position information of the user U and therefore not necessary to attach a marker to the user U.

Figure 9A:
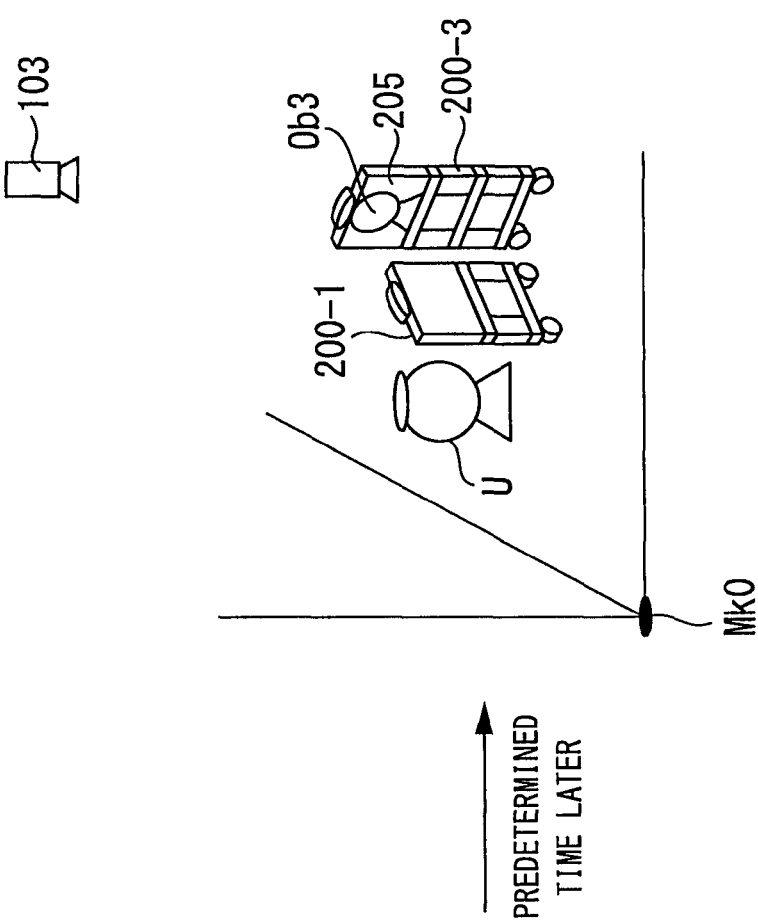
FIGS. 9A and 9B are schematic diagrams showing an example where images are viewed with the user having virtually become a specified object according to an embodiment of the present invention.
Figure 9B:
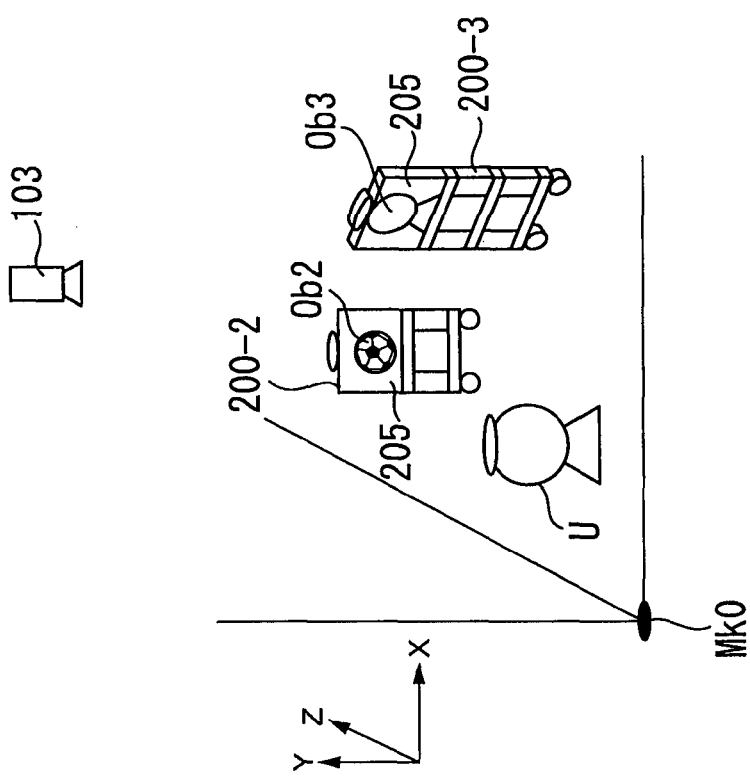

FIGS. 9A and 9B schematically show movement of the respective information presentation apparatuses 200 when the mode where the user views the information presentation apparatuses 200 having virtually become a specified object (the person Ob1) has been selected. FIG. 9B shows a state where a predetermined time has elapsed from the state shown in FIG. 9A. Although the three-dimensional information of the information presentation apparatuses 200 in FIGS. 9A and 9B matches the positions shown in FIGS. 8A and 8B, FIGS. 9A and 9B differ in that the user U is positioned at the position at which the information presentation apparatus 200-1 is positioned in FIG. 8A and in that the display units 205 of the information presentation apparatus 200-2 and the information presentation apparatus 200-3 are oriented toward the user U.

In the example shown in FIGS. 9A and 9B, since the state where the user is viewing the information presentation apparatuses 200 having virtually become the person Ob1 has been selected, control is carried out so that the information presentation apparatuses 200-2 and 200-3 which show the objects aside from the object Ob1 are always oriented toward the user U. Also, as shown in FIG. 9B, the positional relationships between the respective objects in the image contents are reproduced as relative positional relationships with the position of the user U as a standard.

By carrying out the processing described above, since the three-dimensional movement of the objects in the image content is accurately reproduced by the information presentation apparatuses 200, it is possible for the user to experience the contents with heightened realism.

Also, since the three-dimensional movement of the objects inside the image contents is reliably reproduced by the information presentation apparatuses 200, it is possible to gain a sense of perspective for the objects and to understand the distances between such objects, and the like more correctly, so that the user U can understand the content of the image contents more deeply.

In addition, by selecting the mode where the user views the contents having virtually become one of the objects in the contents, the user U can view the contents and become more involved in the world reproduced therein.

Note that although two examples, that is, when the orientation of the display unit 205 of the information presentation apparatus 200 is fixed and when the orientation of the display unit 205 is oriented toward the user U have been described in the above embodiment, it is also possible to change the angle of the display unit 205 corresponding to the angle of the object image pickup camera 101 during generation of an image content. In such case, angle information of the object image pickup camera 101 is recorded in advance in the correspondence table Tb1 and the angle of the display unit 205 is decided based on the recorded angle information.

Also, although an example where the information presentation apparatuses 200 move so as to reproduce the movement of the objects in the content has been described in the above embodiment, it is possible to use a configuration where a movement type of the information presentation apparatuses 200 changes in accordance with a movement type of the user U, such as when an information presentation apparatus 200 moves away from a user U when the user U is detected.

Although images picked up by the object image pickup cameras 101 are displayed on the display units 205 of the information presentation apparatuses 200 in the embodiment described above, it is also possible to cut out the parts that show the objects from the images resulting from image pickup by the overhead view camera 103 and to display such cutout images on the respective display units 205.

Also, although an example of a configuration that carries out image pickup of image contents to be presented by the information presentation apparatuses 200 in advance and moves the respective information presentation apparatuses 200 based on position information of the objects obtained during image pickup of the contents has been described, it is also possible to use existent image contents.

When existing image contents are used, the correspondence between image contents, the information presentation apparatuses to display such contents, position information of the objects in the images, and the like may be set manually. One example of a user interface (hereinafter simply "UI") for allowing the user to carry out such operation is shown in FIG. 10 and FIGS. 11A to 11C. The UI shown in FIG. 10 and FIGS. 11A to 11C may be provided in one (or both) of the control apparatus 100 and the information presentation apparatuses 200 or may be provided in the operation unit 107 that is formed as a remote controller.

Figure 10:
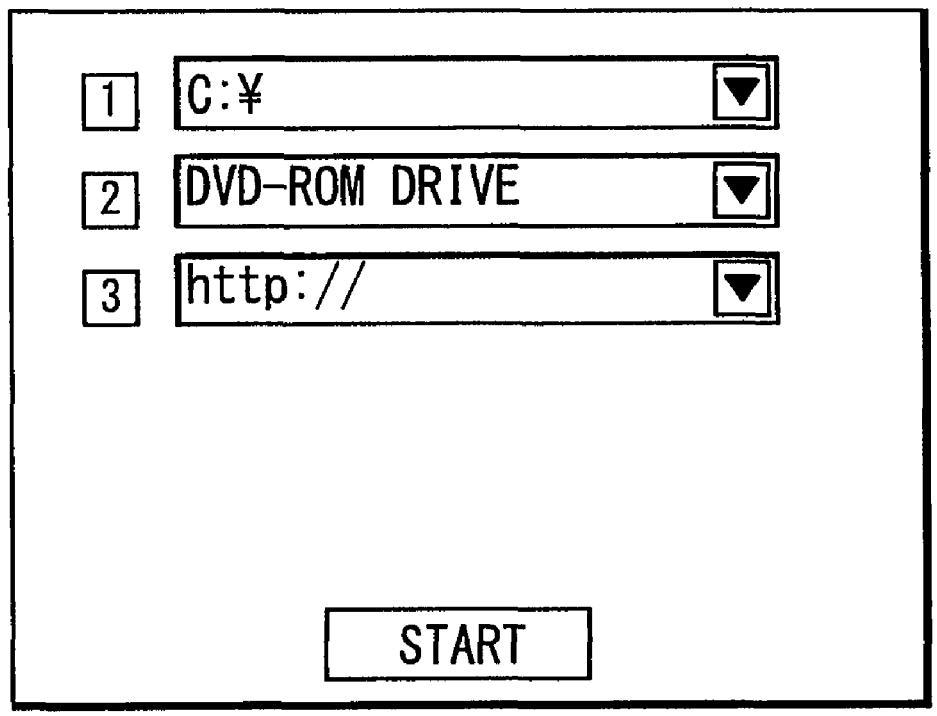
FIG. 10 is a schematic diagram showing an example of a user interface that associates contents with information presentation apparatuses according to another embodiment of the present invention.

The UI shown in FIG. 10 is used to carry out processing that associates an image content and the information presentation apparatus 200 to reproduce the image content. The numbers surrounded by square boxes on the left side of the screen shown in FIG. 10 represent the information presentation apparatuses 200 and by using the list boxes on the right side of such numbers, it is possible to designate the storage positions of the image contents to be displayed on the respective information presentation apparatuses 200. In the example shown in FIG. 10, a content stored in the C drive is to be displayed on the information presentation apparatus (1), a content stored in the DVD-ROM drive is to be displayed on the information presentation apparatus (2), and a content stored on the World Wide Web is to be displayed on the information presentation apparatus (3).

Figure 11A:
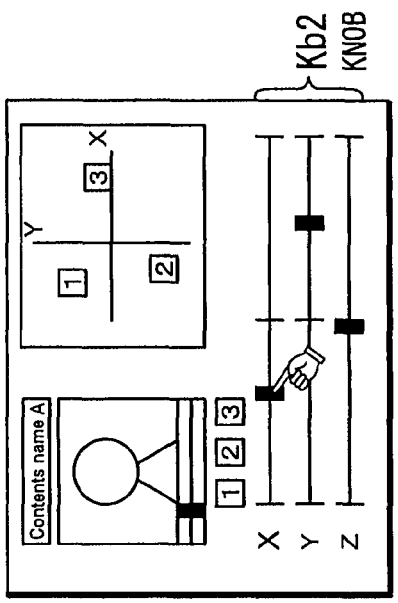
FIGS. 11A to 11C are schematic diagrams showing an example of a user interface that sets a movement target position of an information presentation apparatus according to another embodiment of the present invention.
Figure 11B:
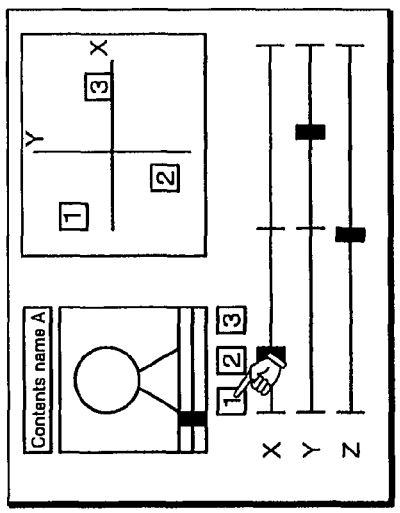
Figure 11C:
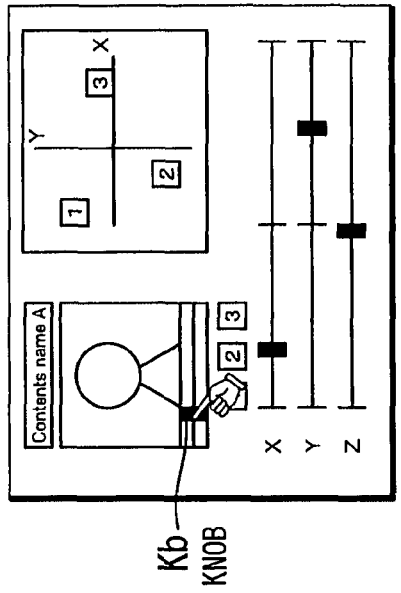

FIGS. 11A to 11C show an example of a UI for setting the movement target positions at each point in time for the respective information presentation apparatuses 200. In the respective UI shown in FIGS. 11A to 11C, a frame for showing an image of a content is provided at the top left of the screen and the arrangement of the information presentation apparatuses 200 is represented on the two axes (i.e., the X axis and the Y axis) to the right of such frame. Knobs Kb2 that can set the various coordinate positions X, Y, Z are provided at the lower part of the screen.

In the UI shown in FIGS. 11A to 11C, first, processing that designates a time code inside the image content is carried out. As shown in FIG. 11A, this operation can be carried out by moving the knob Kb, which can move the time code in the image forward or backward on the time axis, to a desired position on the left-right axis.

After a time code has been designated, processing that selects the information presentation apparatus whose movement target position is to be set by the user is carried out on the screen shown in FIG. 11B. The selection of the information presentation apparatus whose movement target position is to be set by the user can be carried out by pressing one of the buttons provided below the frame showing the image content. The buttons are arranged in the order 1, 2, 3 from the left and correspond to the information presentation apparatuses 200. FIG. 11B shows a state where the information presentation apparatus (1) has been selected.

On the screen shown in FIG. 11B, after the information presentation apparatus whose movement target position is to be set has been selected, processing that actually sets the movement target position is carried out. As shown in FIG. 11C, by moving the knobs Kb2 that are respectively provided for X, Y, Z to desired positions in the left-right direction, the information presentation apparatus is moved in the chart provided at the upper right. In the example shown in FIG. 11C, by moving the knob Kb2 that corresponds to the X axis to the right, the information presentation apparatus (1) in the chart provided at upper right moves to the right in concert. By using this type of UI, it is possible to associate image contents and the operation of the information presentation apparatuses 200.

In this manner, when existing contents are used as contents to be presented on the information presentation apparatuses 200, if each information presentation apparatus 200 is provided with means for obtaining its own three-dimensional position, it will be possible to present information on the information presentation apparatuses 200 by themselves without using the control apparatus 100.

The present invention may also be accomplished by supplying a system or an apparatus with a recording medium in which a program code of software which realizes the functions of the above described embodiment is recorded, and causing a computer (or a control apparatus such as a CPU) of the system or apparatus to read out and execute the program code stored in the recording medium.

As examples of the recording medium for supplying the program code, it is possible to use a floppy disk, a hard disk, an optical disk, a magneto-optical disk, a CD-ROM, a CD-R, a magnetic tape, a nonvolatile memory card and a ROM.

Further, the functions of the above described embodiments may be accomplished not only by executing program code read out by a computer, but also by causing an OS (operating system) or the like which operates on the computer to perform a part or all of the actual processing based on instructions of the program code.

The present invention includes both processing where the steps in a program that construct such software are carried out as a time series in the order given in this specification and processing where such steps are not necessarily carried out as a time series and are carried out separately or in parallel.

Note that the present invention is not limited to the embodiments of the invention described above and can be objected to a variety of modifications without departing from the scope of the invention. It should be understood by those skilled in the art that various modifications, combinations, sub-combinations and alterations may occur depending on design requirements and other factors insofar as they are within the scope of the appended claims or the equivalents thereof.

What is claimed is:
1. An information presentation system comprising:
a plurality of information presentation apparatuses that are movable and display images of a plurality of objects, the number of information presentation apparatuses corresponding to the number of objects; and
a control apparatus that outputs control signals for controlling the information presentation apparatuses to the information presentation apparatuses, wherein
each information presentation apparatus includes:
a display unit that displays images of the objects;
a moving unit capable of moving in a horizontal direction and a vertical direction;
a driving unit that drives the moving unit;
a position sensor that obtains position information for the information presentation apparatus;
a first communication unit that receives at least one of the control signals transmitted from the control apparatus and transmits the position information obtained by the position sensor to the control apparatus; and
a control unit that controls displaying by the display unit and also controls the driving unit, the control apparatus includes:
- an object position information obtaining unit that obtains positions in a three-dimensional space of the plurality of objects;
- a second communication unit that receives the position information transmitted from the information presentation apparatuses; and
- a control unit that calculates target object positions of the information presentation apparatuses to display images of the objects based on the positions of the objects obtained by the object position information obtaining unit and outputs control signals for moving the information presentation apparatuses, and the control unit of the information presentation apparatus control to display an image of the object, for which position information has been obtained by the object position information obtaining unit of the control apparatus, on the display unit and control to drive the driving unit based on the control signal received by the first communication unit.

2. An information presentation system according to claim 1, wherein
the control unit of the control apparatus normalizes the target positions and position information of the plurality of objects in the three-dimensional space calculated by the object position information obtaining unit in accordance with a width of a space in which the plurality of information presentation apparatuses present information, and generates the control signals based on the normalized target positions and the position information of the objects.

3. An information presentation system according to claim 1, wherein
the object position information obtaining unit of the control apparatus obtains the position of a user viewing images being presented by the information presentation apparatuses, and
the control unit of the control apparatus outputs control signals for producing a predetermined positional relationship between the position of the user obtained by the object position information obtaining unit and the positions of the information presentation apparatuses.

4. An information presentation system according to claim 3, wherein
each information presentation apparatus includes an object sensor that detects the position of the user, and
the control unit of each information presentation apparatus controls the driving unit so that the display unit is oriented in a direction of the user detected by the object sensor at the movement target position designated in the control signal outputted from the control apparatus.

5. An information presentation system according to claim 1, wherein
the control apparatus includes an operation unit, and
the control unit of the control apparatus is operable, when an instruction indicating that the user wishes to view the information presentation apparatuses having virtually become one of the plurality of objects has been inputted via the operation unit, to calculate relative positional relationships between the object that the user wishes to become and other objects and recalculates the target object positions of the information presentation apparatuses to display images of the other objects based on the calculated relative positional relationships and position information of the user, with the position information of the user as a standard.

6. An information presentation system according to claim 1, wherein
the information presentation apparatus includes a vertical moving unit capable of lengthening and shortening in a vertical direction, and
the control unit of the information presentation apparatus drives the vertical moving unit based on a position of an object in the vertical direction in the three-dimensional space that has been calculated by the object position information obtaining unit.

7. An information presentation system according to claim 1, wherein
the object position information obtaining unit of the control apparatus carries out processing that associates angle information of a plurality of image pickup apparatuses with the position information of the objects.

8. An information presentation system according to claim 7, wherein
the control unit of the control apparatus sets angles of the display units of the information presentation apparatuses based on angle information of the plurality of image pickup apparatuses and the set angles are included in the control signals.

* * * * *